(12) United States Patent
Hole et al.

(10) Patent No.: US 9,226,254 B2
(45) Date of Patent: *Dec. 29, 2015

(54) COMMUNICATION STATIONS AND METHODS FOR TRANSMITTING ON A RANDOM ACCESS CHANNEL

(75) Inventors: David Philip Hole, Southampton (GB); René Faurie, Courbevoie (FR); Satish Venkob, Waterloo (CA); Steven Michael Hanov, Waterloo (CA); Remo Borsella, Waterloo (CA); Werner Karl Kreuzer, Baiern (DE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,078

(22) Filed: Mar. 10, 2011

(65) Prior Publication Data

US 2011/0222475 A1 Sep. 15, 2011

(30) Foreign Application Priority Data

Mar. 12, 2010 (EP) ..................................... 10290128

(51) Int. Cl.
*H04W 56/00* (2009.01)
*H04W 74/00* (2009.01)

(52) U.S. Cl.
CPC ........ *H04W 56/0045* (2013.01); *H04W 74/004* (2013.01)

(58) Field of Classification Search
CPC ........................ H04W 56/0045; H04W 74/004

USPC ........... 370/352–356, 331, 343; 455/455, 502
See application file for complete search history.

(56) References Cited

U.S. PATENT DOCUMENTS

| | | | | |
|---|---|---|---|---|
| 5,818,829 | A | * | 10/1998 | Raith et al. ..................... 370/347 |
| 6,633,559 | B1 | * | 10/2003 | Asokan et al. ................ 370/350 |
| 6,772,112 | B1 | | 8/2004 | Ejzak |
| 6,813,280 | B2 | | 11/2004 | Vanttinen et al. |

(Continued)

FOREIGN PATENT DOCUMENTS

| | | |
|---|---|---|
| CN | 1338192 | 2/2002 |
| CN | 101154992 | 4/2008 |

(Continued)

OTHER PUBLICATIONS

Patent Cooperation Treaty, "International Search Report," issued by the International Searching Authority in connection with PCT application No. PCT/IB2011/051003, mailed Jul. 1, 2011 (4 pages).

(Continued)

*Primary Examiner* — Khaled Kassim
(74) *Attorney, Agent, or Firm* — Fish & Richardson P.C.

(57) ABSTRACT

Example communication stations and methods for transmitting on a random access channel (RACH) in wireless networks are disclosed herein. An example method for transmitting on an enhanced RACH by a device such that an initial access burst is received in a single time slot by a wireless network involves determining a timing advance, the timing advance being associated with a serving cell. The example method also involves transmitting, using the determined timing advance, the initial access burst, on the enhanced RACH, that includes at least one of an identifier or user data.

12 Claims, 6 Drawing Sheets

(56) References Cited

U.S. PATENT DOCUMENTS

| | | | |
|---|---|---|---|
| 6,870,858 B1 | 3/2005 | Sebire | |
| 6,963,544 B1 | 11/2005 | Balachandran et al. | |
| 7,392,051 B2 | 6/2008 | Rajala et al. | |
| 7,433,334 B2 | 10/2008 | Marjelund et al. | |
| 7,843,895 B2 | 11/2010 | Park et al. | |
| 8,085,725 B2 | 12/2011 | Zhou | |
| 8,238,895 B2 | 8/2012 | Sorbara et al. | |
| 8,243,667 B2 | 8/2012 | Chun et al. | |
| 8,284,725 B2 | 10/2012 | Ahmadi | |
| 8,363,671 B2 | 1/2013 | Korhonen et al. | |
| 8,498,347 B2 | 7/2013 | Kawamura et al. | |
| 8,848,653 B2 | 9/2014 | Edge et al. | |
| 2002/0071480 A1 | 6/2002 | Marjelund et al. | |
| 2002/0080758 A1 | 6/2002 | Landais | |
| 2002/0126630 A1 | 9/2002 | Vanttinen et al. | |
| 2003/0002457 A1 | 1/2003 | Womack et al. | |
| 2003/0117995 A1* | 6/2003 | Koehn et al. | 370/350 |
| 2003/0133426 A1 | 7/2003 | Schein et al. | |
| 2004/0077348 A1 | 4/2004 | Sebire et al. | |
| 2004/0184440 A1 | 9/2004 | Higuchi et al. | |
| 2004/0196826 A1 | 10/2004 | Bao et al. | |
| 2004/0248575 A1 | 12/2004 | Rajala et al. | |
| 2004/0264421 A1 | 12/2004 | Sato et al. | |
| 2005/0030919 A1 | 2/2005 | Lucidarme et al. | |
| 2006/0035634 A1 | 2/2006 | Swann et al. | |
| 2006/0072520 A1 | 4/2006 | Chitrapu et al. | |
| 2007/0064665 A1* | 3/2007 | Zhang et al. | 370/343 |
| 2007/0115816 A1 | 5/2007 | Sinivaara | |
| 2007/0136279 A1 | 6/2007 | Zhou et al. | |
| 2007/0147326 A1 | 6/2007 | Chen | |
| 2007/0149206 A1* | 6/2007 | Wang et al. | 455/450 |
| 2007/0165567 A1 | 7/2007 | Tan et al. | |
| 2007/0224990 A1 | 9/2007 | Edge et al. | |
| 2007/0265012 A1 | 11/2007 | Sorbara et al. | |
| 2007/0291696 A1* | 12/2007 | Zhang et al. | 370/331 |
| 2008/0049708 A1 | 2/2008 | Khan et al. | |
| 2008/0080627 A1* | 4/2008 | Korhonen et al. | 375/260 |
| 2008/0084849 A1 | 4/2008 | Wang et al. | |
| 2008/0107055 A1 | 5/2008 | Sim et al. | |
| 2008/0188220 A1 | 8/2008 | DiGirolamo et al. | |
| 2008/0225785 A1 | 9/2008 | Wang et al. | |
| 2008/0233992 A1 | 9/2008 | Oteri et al. | |
| 2008/0240028 A1 | 10/2008 | Ding et al. | |
| 2008/0267127 A1* | 10/2008 | Narasimha et al. | 370/331 |
| 2008/0273610 A1* | 11/2008 | Malladi et al. | 375/260 |
| 2008/0316961 A1 | 12/2008 | Bertrand et al. | |
| 2009/0046629 A1 | 2/2009 | Jiang et al. | |
| 2009/0046676 A1 | 2/2009 | Krishnaswamy et al. | |
| 2009/0109908 A1 | 4/2009 | Bertrand et al. | |
| 2009/0109937 A1* | 4/2009 | Cave et al. | 370/336 |
| 2009/0141685 A1 | 6/2009 | Berglund | |
| 2009/0197587 A1 | 8/2009 | Frank | |
| 2009/0201868 A1 | 8/2009 | Chun et al. | |
| 2009/0232107 A1 | 9/2009 | Park et al. | |
| 2009/0232236 A1 | 9/2009 | Yamamoto et al. | |
| 2009/0233615 A1 | 9/2009 | Schmitt | |
| 2009/0239568 A1 | 9/2009 | Bertrand et al. | |
| 2009/0252125 A1 | 10/2009 | Vujcic | |
| 2009/0316638 A1 | 12/2009 | Yi et al. | |
| 2009/0318175 A1 | 12/2009 | Sandberg | |
| 2010/0041393 A1 | 2/2010 | Kwon et al. | |
| 2010/0054235 A1 | 3/2010 | Kwon et al. | |
| 2010/0074130 A1 | 3/2010 | Bertrand et al. | |
| 2010/0074246 A1 | 3/2010 | Harada et al. | |
| 2010/0099393 A1 | 4/2010 | Brisebois et al. | |
| 2010/0112992 A1* | 5/2010 | Stadler et al. | 455/415 |
| 2010/0118816 A1* | 5/2010 | Choi et al. | 370/329 |
| 2010/0120443 A1 | 5/2010 | Ren | |
| 2010/0130220 A1 | 5/2010 | Laroia et al. | |
| 2010/0159919 A1 | 6/2010 | Wu | |
| 2010/0172299 A1 | 7/2010 | Fischer et al. | |
| 2010/0195574 A1* | 8/2010 | Richeson et al. | 370/328 |
| 2010/0202354 A1 | 8/2010 | Ho | |
| 2010/0220713 A1 | 9/2010 | Tynderfeldt et al. | |
| 2010/0254356 A1 | 10/2010 | Tynderfeldt et al. | |
| 2010/0284376 A1 | 11/2010 | Park et al. | |
| 2011/0038361 A1 | 2/2011 | Park et al. | |
| 2011/0069800 A1 | 3/2011 | Ohta et al. | |
| 2011/0107172 A1* | 5/2011 | Chapman et al. | 714/752 |
| 2011/0222476 A1 | 9/2011 | Hole et al. | |
| 2011/0222527 A1 | 9/2011 | Hole et al. | |
| 2011/0305197 A1 | 12/2011 | Park et al. | |
| 2012/0250659 A1* | 10/2012 | Sambhwani | 370/332 |

FOREIGN PATENT DOCUMENTS

| | | |
|---|---|---|
| CN | 101188465 | 5/2008 |
| CN | 101330452 | 12/2008 |
| CN | 101390431 | 3/2009 |
| CN | 101426253 | 5/2009 |
| CN | 101461279 | 6/2009 |
| EP | 0951192 | 10/1999 |
| EP | 1791307 | 5/2007 |
| EP | 2023548 | 2/2009 |
| EP | 2034755 | 3/2009 |
| EP | 2043391 | 4/2009 |
| EP | 2101538 | 9/2009 |
| EP | 2104339 | 9/2009 |
| EP | 2104393 | 9/2009 |
| EP | 2187578 | 5/2010 |
| EP | 2141938 | 6/2010 |
| FR | 2831009 | 4/2003 |
| GB | 2448889 | 11/2008 |
| TW | 200614735 | 5/2006 |
| TW | 201026131 | 7/2010 |
| WO | 94/05095 | 3/1994 |
| WO | 98/26625 | 6/1998 |
| WO | 00/54536 | 9/2000 |
| WO | 0079823 | 12/2000 |
| WO | 01/11907 | 2/2001 |
| WO | 01/17283 | 3/2001 |
| WO | 01/63839 | 8/2001 |
| WO | 2005039201 | 4/2005 |
| WO | 2007/109695 | 9/2007 |
| WO | 2008097626 | 8/2008 |
| WO | 2008136488 | 11/2008 |
| WO | 2009/059518 | 5/2009 |
| WO | 2009/088873 | 7/2009 |
| WO | 2009088160 | 7/2009 |
| WO | 2009155833 | 12/2009 |

OTHER PUBLICATIONS

Patent Cooperation Treaty, "Written Opinion of the International Searching Authority," issued by the International Searching Authority in connection with PCT/IB2011/051003, mailed Jul. 1, 2011 (6 pages).

"3rd Generation Partnership Project; Group Core Network and Terminals; Mobile radio interface Layer 3 specification; Core network protocols; Stage 3 (Release 9)," 3GPP TS 24.008 V9.1.0, Dec. 18, 2009, (595 pages).

Panasonic: "DRX and DTX Operation in LTE_Active," 3GPP Draft; R2-060888, 3rd Generation Partnership Project (3GPP), Athens, Greece, Mar. 27-31, 2006, (3 pages).

"3rd Generation Partnership Project; Technical Specification Group GSM/EDGE Radio Access Network; Mobile radio interface layer 3 specification; Radio Resource Control (RRC) protocol (Release 9)," 3GPP TS 44.018 V9.3.0, Dec. 18, 2009, (428 pages).

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 9)," 3GPP TS 44.060 V9.2.0, Dec. 18, 2009, (596 pages).

LG Electronics: "Uplink resource request for uplink scheduling," 3GPP Draft; R1-060922 UL Request_With TP, 3rd Generation Partnership Project (3GPP), Athens, Greece, Mar. 27-31, 2006, (4 pages).

"3rd Generation Partnership Project; Technical Specification Group Services and System Aspects; Vocabulary for 3GPP Specifications (Release 9)," 3GPP TR 21.905 V9.4.0, Dec. 19, 2009, (57 pages).

(56) References Cited

OTHER PUBLICATIONS

Patent Cooperation Treaty, "International Search Report," issued by the International Searching Authority in connection with PCT application No. PCT/IB2011/051008, mailed Jun. 8, 2011 (4 pages).
Patent Cooperation Treaty, "Written Opinion of the International Searching Authority," issued by the International Searching Authority in connection with PCT/IB2011/051008, mailed Jun. 8, 2011 (11 pages).
Patent Cooperation Treaty, "International Search Report," issued by the International Searching Authority in connection with PCT application No. PCT/IB2011/051011, mailed Jul. 13, 2011 (4 pages).
Patent Cooperation Treaty, "Written Opinion of the International Searching Authority," issued by the International Searching Authority in connection with PCT/IB2011/051011, mailed Jul. 13, 2011 (11 pages).
European Patent Office, "Extended European Search Report," issued in connection with EP Application No. 10290128.7, dated Aug. 20, 2010, (5 pages).
European Patent Office, "Extended European Search Report," issued in connection with EP Application No. 10290132.9, dated Sep. 7, 2010, (11 pages).
European Patent Office, "Extended European Search Report," issued in connection with EP Application No. 10290133.7, dated Sep. 6, 2010, (8 pages).
"3rd Generation Partnership Project; Technical Specification Group GSM/EDGE Radio Access Network; Radio Subsystem Synchronization (Release 9)," 3GPP TS 45.010 V9.0.0, Nov. 2009, (31 pages).
"3rd Generation Partnership Project; Technical Specification Group GSM/EDGE Radio Access Network; Channel Coding (Release 9)," 3GPP TS 45.003 V9.0.0, Dec. 2009, (321 pages).
"3rd Generation Partnership Project; Technical Specification Group GSM/EDGE Radio Access Network; Multiplexing and Multiple Access on the Radio Path (Release 9)," 3GPP TS 45.002 V9.2.0, Nov., 2009, (108 pages).
Taiwan Intellectual Property Office, "Summary Translation of the Office Action from the Intellectual Property Office," issued in connection with application No. TW 100108165, on Feb. 13, 2014, 1 page.
European Patent Office, "Exam Report," issued in connection with EP Application No. 10290132.9, dated Nov. 13, 2012, (5 pages).
Patent Cooperation Treaty, "International Preliminary Report on Patentability," issued by the International Searching Authority in connection with PCT application No. PCT/IB2011/051008, mailed Sep. 18, 2012 (10 pages).
European Patent Office, "Exam Report," issued in connection with EP Application No. 10290133.7, dated Nov. 13, 2012, (5 pages).
Patent Cooperation Treaty, "International Preliminary Report on Patentability," issued by the International Searching Authority in connection with PCT application No. PCT/IB2011/051011, mailed Sep. 18, 2012 (10 pages).
European Patent Office, "Exam Report," issued in connection with EP Application No. 10290128.7, dated Apr. 20, 2012, (5 pages).
Patent Cooperation Treaty, "International Preliminary Report on Patentability," issued by the International Searching Authority in connection with PCT application No. PCT/IB2011/051003, mailed Sep. 18, 2012 (6 pages).
United States Patent and Trademark Office, "Non-Final Office Action," issued in connection with U.S. Appl. No. 13/045,088, on Nov. 29, 2012 (17 pages).
United States Patent and Trademark Office, "Non-Final Office Action," issued in connection with U.S. Appl. No. 13/045,099, on Nov. 7, 2012 (17 pages).
United States Patent and Trademark Office, "Final Office Action," issued in connection with U.S. Appl. No. 13/045,088, on Apr. 26, 2013 (17 pages).
United States Patent and Trademark Office, "Advisory Action," issued in connection with U.S. Appl. No. 13/045,088, on Jul. 24, 2013 (3 pages).
United States Patent and Trademark Office, "Final Office Action," issued in connection with U.S. Appl. No. 13/045,099, on Jun. 17, 2013 (20 pages).
European Patent Office, "Exam Report," issued in connection with European Patent Application No. 10290128.7, on Aug. 13, 2013 (3 pages).
Intellectual Property Office, "Office Action and Search Report," issued in connection with Taiwan Patent Application No. 100108167, on Aug. 13, 2013 (7 pages).
Intellectual Property Office, "Office Action," issued in connection with Taiwanese Patent Application No. 100108165 on Feb. 13, 2014 (8 pages).
Canadian Intellectual Property Office, "Office Action," issued in connection with Canadian Patent Application No. 2,792,734, on Oct. 16, 2014 (3 pages).
Canadian Intellectual Property Office, "Office Action," issued in connection with Canadian Application No. 2,792,734, on Oct. 16, 2014 (2 pages).
Canadian Intellectual Property Office, "Examination Report," issued in connection with Canadian Application No. 2,792,738, Jul. 25, 2014 (3 pages).
United States Patent and Trademark Office, "Office Action," issued in connection with United States Patent Application No. 13/045,088, Sep. 2, 2014 (16 pages).
United States Patent and Trademark Office, "Office Action," issued in connection with U.S. Appl. No. 13/045,099, Jun. 6, 2014 (16 pages).
Canadian Intellectual Property Office, "Exam Report," issued in connection with Canadian Application No. 2,792,794, on Jul. 24, 2014 (3 pages).
United States Patent and Trademark Office, "Final Office Action," issued in connection with U.S. Appl. No. 13/045,099, on Jan. 2, 2015 (17 pages).
Intellectual Property Office, "Office Action and Search Report," issued in connection with Taiwan Patent Application No. 100108158, on Aug. 28, 2013, 10 pages.
Intellectual Property Office, "Office Action and Search Report," issued in connection with Taiwan Patent Application No. 100108167, on Aug. 8, 2013, 12 pages.
"Long Term Evolution Protocol Overview," Freescale Semiconductor, document No. LTEPTCLOVWWP, Oct. 2008, 21 pages.

* cited by examiner

FRAME STRUCTURE

LEGACY ACCESS BURST STRUCTURE

COMMUNICATION STATIONS AND METHODS FOR TRANSMITTING ON A RANDOM ACCESS CHANNEL

RELATED APPLICATIONS

This patent claims priority to European Patent Application No. 10290128.7, filed Mar. 12, 2010, which is hereby incorporated by reference herein in its entirety.

This application is related to U.S. Patent Applications bearing (U.S. Ser. No. 13/045,165), (U.S. Ser. No. 13/045,125), (U.S. Ser. No. 13/045,088), (U.S. Ser. No. 13/045,099), all of which are filed concurrently herewith, and all of which are hereby incorporated by reference herein in their entireties.

This application is related to European Patent Application Nos. 10290129.5, 10290130.3, 10290131.1, 10290132.9, 10290133.7, all of which were filed on Mar. 12, 2010, and all of which are hereby incorporated by reference herein in their entireties.

TECHNICAL FIELD

Embodiments pertain to wireless communications. Some embodiments relate to GSM networks including general packet radio service (GPRS) and enhanced GPRS (EGPRS) networks. Some embodiments relate to communicating on a random access chancel (RACH). Some embodiments relate to communications and data transmissions on a RACH including small data transfer (SDT) on a RACH.

BACKGROUND

One issue with communicating data over a wireless network is the amount of signaling overhead conventionally required for each data transfer. The signaling overhead may include a request for bandwidth, an allocation of bandwidth on a data channel, an acknowledgement of the data transfer and any signaling for data retransmissions. For larger data transfers, the signaling overhead may be relatively small compared to the amount of data, however for smaller data transfers, the signaling overhead becomes more significant.

Another issue with communicating data as well as other information over a wireless network is the amount of delay due to bandwidth request and allocation process conventionally utilized for each data transfer. For smaller data transfers, the amount of delay may be significant compared to the time required to actually send the data.

Thus, there are general needs for communication stations, base stations, and methods that reduce signaling overhead associated with communicating information in a wireless network. There are also general needs for communication stations, base stations, and methods that reduce the delay associated with communicating in a wireless network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
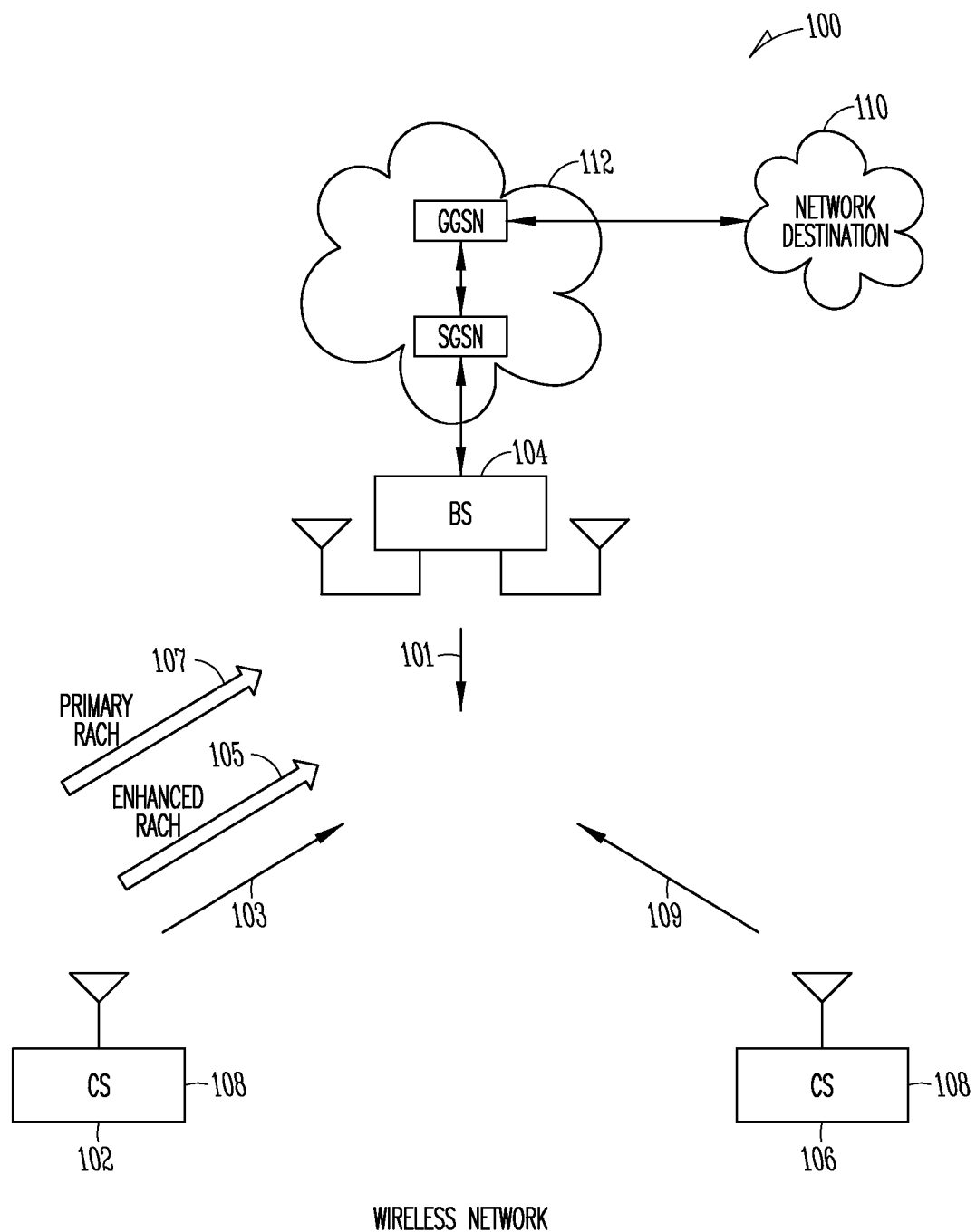
FIG. 1 illustrates a base station and mobile stations of a wireless network in accordance with some embodiments.

FIG. 1 illustrates a wireless network in accordance with some embodiments. Wireless network 100 includes a base station (BS) 104, one or more communication stations (CS) 108 and one or more network entities 112. In some embodiments, the wireless network 100 may be a GSM network, including a GPRS or an EGPRS network, although this is not a requirement. In accordance with some embodiments, a communication station, such as communication station 102, may be configured for transmitting small amounts of data and other information on an enhanced random-access channel (RACH) 105. In these embodiments, the communication station 102 may receive a notification 101 from the base station 104 the existence of the enhanced RACH 105 that is configured for initial transmissions. The notification 101 may include parameters defining the enhanced RACH 105. The communication station 102 may perform an initial access on the enhanced RACH 105 when a timing advance (TA) is known by the communication station 102. In these embodiments, the initial access may comprise transmitting an initial access burst 103 that includes at least one of an identifier and data. The identifier may be a shortened identifier which may be used to identify the communication station 102. The data included in the initial access burst 103 may comprise user data and may have a network destination 110. The data included in the initial access burst 103 may comprise information other than what is conventionally transmitted on a random-access channel.

The timing advance may be an amount of time (or estimate thereof) that the communication station 102 may advance its transmission of the initial access burst 103 so that the initial access burst 103 is received by the base station 104 within a single time slot of the enhanced RACH 105 (i.e., rather than across more than one time slot which may result when the timing advance is unknown). In these embodiments, the timing advance is greater than zero. In some embodiments, the communication station 102 may delay its transmission of the initial access burst 103 based on the timing advance so that the initial access burst 103 is received by the base station 104 within a single time slot of the enhanced RACH 105. The timing advance depends on the signal propagation delay between the communication station 102 and the base station 104. The timing advance may be a timing advance that is associated with a serving cell. In some embodiments, the timing advance may be applied to any transmitted burst desired to be received within a time-division multiplexed uplink channel.

In some embodiments, the parameters defining the enhanced RACH 105 that are transmitted in the notification

101 may include among other things, indication of the time slots of a physical channel that comprise the enhanced RACH 105. In these embodiments, the communication station 102 may be notified of the time slots of a common control channel (CCCH) which may comprise the enhanced RACH 105. These embodiments are discussed in more detail below.

Because the enhanced RACH 105 is a random-access channel in which communication stations 108 are not assigned specific channel resources thereon for transmission of initial access bursts 103, collisions may occur. Embodiments discussed in more detail below may reduce or eliminate the probability of such collisions. In some embodiments, the enhanced RACH 105 may be a secondary RACH. A primary RACH 107 may be provided by the base station 104 for transmission of access request messages 109 by communication stations 108, such as communication 106, for requesting assignment of a channel resource for a subsequent transmission of data.

Data transmitted in the initial access burst 103 on the enhanced RACH 105 may have a network destination 110 within the communication network 100 rather than being for use by base station 104 or for use by a base station controller. The use of the enhanced RACH 105 for the transmission of smaller amounts of data may result in a significant reduction in the amount of network resources that are conventionally used for transmission of data. In these embodiments, the signaling conventionally required for channel resource requests may be reduced or eliminated and a temporary block flow (TBF) may not need to be established. For example, the initial access burst 103 may be transmitted on the enhanced RACH 105 when no prior connection, such as a TBF, has been established between the communication station 102 and the base station 104. The initial access burst 103 may be transmitted on the enhanced RACH 105, for example, when no uplink bandwidth has been allocated for data transmission. The initial access burst 103 may also be transmitted on the enhanced RACH 105, for example, without permission by the network. In some embodiments discussed in more detail below, the signaling and network resources associated with acknowledgements may also be reduced or eliminated.

Figure 2:
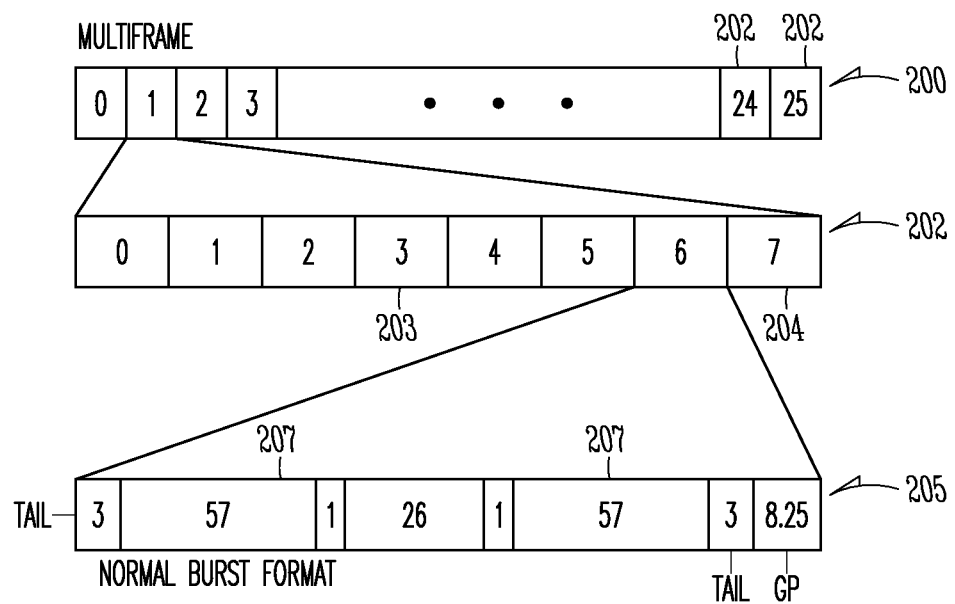
FIG. 2 illustrates a frame structure in accordance with some example embodiments.

FIG. 2 illustrates a frame structure in accordance with some embodiments. The frame structure may be used by GPRS and EGPRS embodiments of wireless network 100 (FIG. 1). In these embodiments, a multiframe 200 may comprise a plurality of frames 202 and each frame 202 may comprise a plurality of time slots 204. In this example, the multiframe 200 comprises twenty-six frames 202 and each frame 202 comprises eight time slots 204. FIG. 2 also illustrates a normal-burst format 205 which may be used for transmissions within at least some of time slots 204. In some embodiments, one or more of the time slots 204 of a frame 202, such as time slot 203, may comprise the enhanced RACH 105 (FIG. 1). These embodiments are discussed in more detail below. Some of the other time slots 204 may be designated as the primary RACH 107 (FIG. 1) as well as control and data channels, although this is not a requirement.

In some embodiments, the normal-burst format 205 may be used for transmissions within at least some of time slots of the enhanced RACH 105. In these embodiments, the initial access burst 103 (FIG. 1) may be configured as a normal burst in normal-burst format 205 and may, for example, include data portions 207 as illustrated.

The primary RACH 107 may be a conventional RACH which is an uplink-only channel in which access is contention-based and access does not require a known timing advance. The enhanced RACH 105, on the other hand, may be an uplink-only channel in which access is contention-based using a known or estimated timing advance. With contention-based access, communication stations 108 may autonomously select when to transmit on a RACH as there is no device-specific scheduling. Access on the primary RACH 107 may assume the timing advance is not known. The primary RACH 107 may be a logical channel that forms part of a CCCH, which is a bi-directional channel (i.e., carrier+ timeslot) in which an uplink portion is used for the primary RACH 107. Contention-based access on the primary RACH 107 permits communication stations 108 to trigger a request for uplink resources based on requirements rather than, for example, being scheduled periodic uplink resources which may not be needed. With contention-based access, there is a risk that access bursts of two or more communication stations 108 overlap and collide. With contention-based access, there is also a risk that two or more communication stations 108 transmit within the same timeslot of a RACH.

Figure 3A:
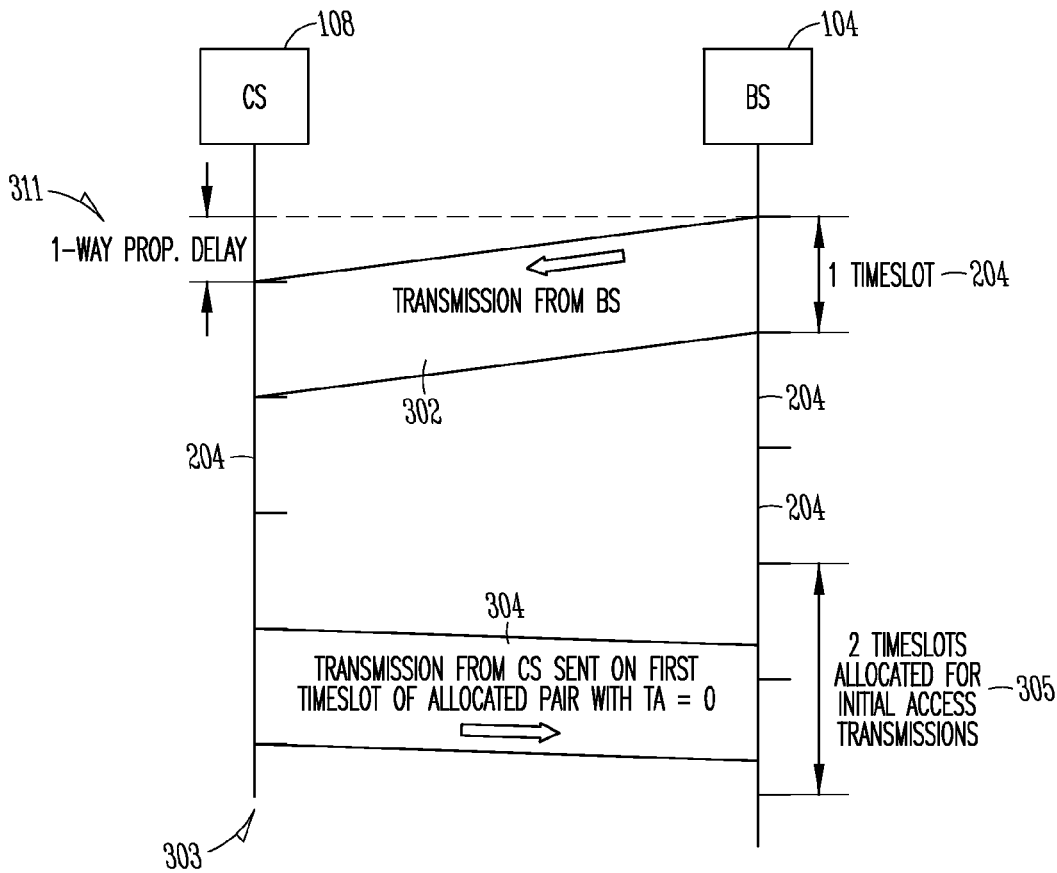
FIG. 3A illustrates the timing of a transmission by a communication station when a timing advance is not known in accordance with some embodiments.

FIG. 3A illustrates transmission by a communication station when a timing advance is not known in accordance with some embodiments. A transmission 302 from base station 104 may be received by communication station 108 after a one-way signal propagation delay 311. Because a communication station 108 may synchronize its time-base 303 (an observed time-base) with transmissions received by the base station 104, the transmission 302 may be received within a single time-slot at the communication station 108. A transmission 304 from the communication station 108 to the base station 104, on the other hand, may be received at the base station 104 within more than one time slot when the timing advance value is not known by the communication station 108. Accordingly, during an initial access phase, two contiguous time slots 305 may be conventionally allocated for initial access transmissions a RACH, such as on the primary RACH 107 (FIG. 1). Conventionally, bursts that are significantly shorter than a time slot may be used during the initial access phase so that the burst can be received within a single time slot. In some GSM embodiments, when the timing advance is not known, timeslots may be paired and transmissions may be transmitted in accordance with a reduced transmission time interval (RTTI) mode.

A communication station 108 may transmit access request messages 109 (FIG. 1) using conventional access bursts which include additional guard bits to mitigate the unknown signal propagation delay at the communication station 108. As a result, a conventional access burst on primary RACH 107 is limited in the amount of useful information that may be included therein due to this long guard period. In GSM and EDGE networks, this amount of useful information may be limited to eight or eleven bits.

Transmission 302 may be a normal-burst transmission from the base station 104 and may be used by the communication stations 108 to synchronize its time-base 303, although this is not a requirement. The communication stations 108 may use other base station transmissions, such as synchronization transmissions from the network, to synchronize their time-base 303.

The network may determine and assign a timing advance value to a communication station 108 after the initial access procedure which may be part of an initial timing advance estimation procedure so that subsequent communications on the control and data channels are received within designated time slots. In this way, normal bursts may be used and the use of significant guard bits can be avoided. The network may also regularly update the timing advance value based on the timing variance of access bursts sent on the uplink control channel. In case of GPRS and EDGE configured networks, the timing advance may be updated using packet timing advance control channels (PTCCH) based on the timing variance of access bursts sent on the uplink PTCCH. This is a continuous timing advance update procedure that may require additional signalling. The network may also monitor the delay of normal bursts and access bursts sent by the communication station 108 on various control channels (e.g., in case of explicit polling by network for the access bursts).

In some alternate embodiments, two contiguous time slots may be assigned to a RACH to allow access bursts that are configured in a normal-burst format 205 to be received when the timing advance is not known. For example, the enhanced RACH 105 may comprise two contiguous time slots to allow an initial access burst 103 configured in normal-burst format 205 to be received when the timing advance is not known.

Figure 3B:
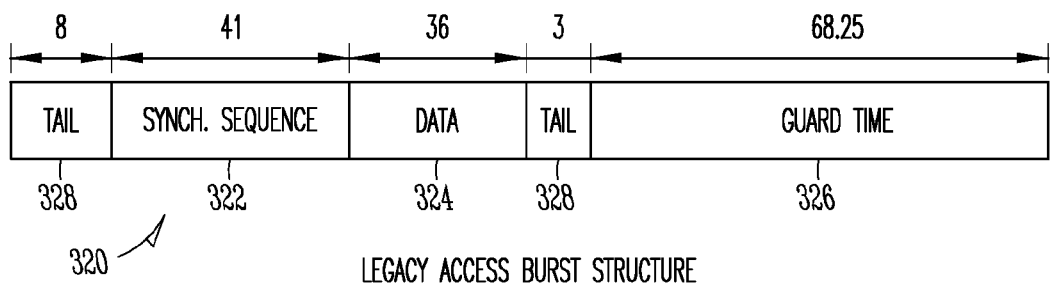
FIG. 3B illustrates a legacy access burst structure.

FIG. 3B illustrates a legacy access burst structure. An access burst in accordance with burst structure 320 may be used to request and establish a packet data connection using the primary RACH 107 (FIG. 1). Burst structure 320 may be used for transmitting an access request message 109 (FIG. 1) using the primary RACH 107 when the timing advance is unknown by a communication station. The synchronization sequence field 322 may be the same for all communication stations 108 and may be used by the network to evaluate the distance of the communication station. The data field 324 may contain a predetermined number (e.g., 8 or 11) of information bits depending on the coding scheme used, and the guard time field 326 may be used to help guarantee that the base station 104 can properly receive the data field 324 within a time slot. Burst structure 320 may also include tail bits 328. In GPRS and EGPRS wireless networks, a communication station 108 may request resources by transmitting an access request message 109, which may be referred to as channel request message or an EGPRS packet channel request message, on the primary RACH 107. In these embodiments, the primary RACH 107 may be a conventional RACH.

The access request message 109 transmitted on the primary RACH 107 may include information for use in establishing a subsequent connection in the data field 324 rather than data having a network destination 110. For example, data field 324 may include an establishment cause, a request for either a one-phase or a two-phase access and/or a random reference. Since the data field 324 is part of an access request message 109, the data field 324 does not include data that is destined for a network destination 110 (FIG. 1). Data field 324 may include information for use only by the base station 104 or a network controller, such as a base station controller (not shown in FIG. 1), which may be used for allocating resources (e.g. timeslots, carriers, spreading codes, etc.) for a subsequent transmission of data that may be destined for a destination within the network.

One issue with transmitting a conventional access request message, such as the access request message 109, on the primary RACH 107 is that it does not include identification information that may uniquely identify the transmitting station. Although the access request message 109 may comprise one or more random bits, the same random bits may be selected by two communication stations transmitting simultaneously on the primary RACH 107. As discussed in more detail below, an identifier, such as a shortened identifier, may be transmitted in the initial access burst 103 on the enhanced RACH 105 to uniquely identify the transmitting station.

A conventional access request message may be retransmitted (for example, in case no response is received from the network) up to a maximum number of times which may be indicated by the network in a RACH control parameter information element. The spacing between successive attempts may be configured to reduce or minimize collisions with other communication stations. After transmitting a conventional access request message, a communication station 108 may listen to a broadcast channel (BCCH) and to a downlink common control channel timeslot for an immediate assignment message from the network for assignment of network resources. The network may also send an immediate assignment reject message, for example when no resources are available.

In accordance with some embodiments, the initial access burst 103 that may be transmitted on the enhanced RACH 105 may comprise an enhanced access burst in which at least some guard bits of guard time 326 are replaced with bits conveying the data. In these embodiments, the enhanced access burst may be configured in accordance with a legacy access burst structure 320. In these embodiments, the data conveyed within some or all of the guard bits may be data having a network destination 110 rather than control data for use by the base station 104, although this is not a requirement. In these embodiments, an enhanced access burst configured in accordance with the legacy access burst structure 320 may be transmitted with a known timing advance to be received within a single time slot of the enhanced RACH 105 to help ensure that the data bits are properly received.

Figure 3C:
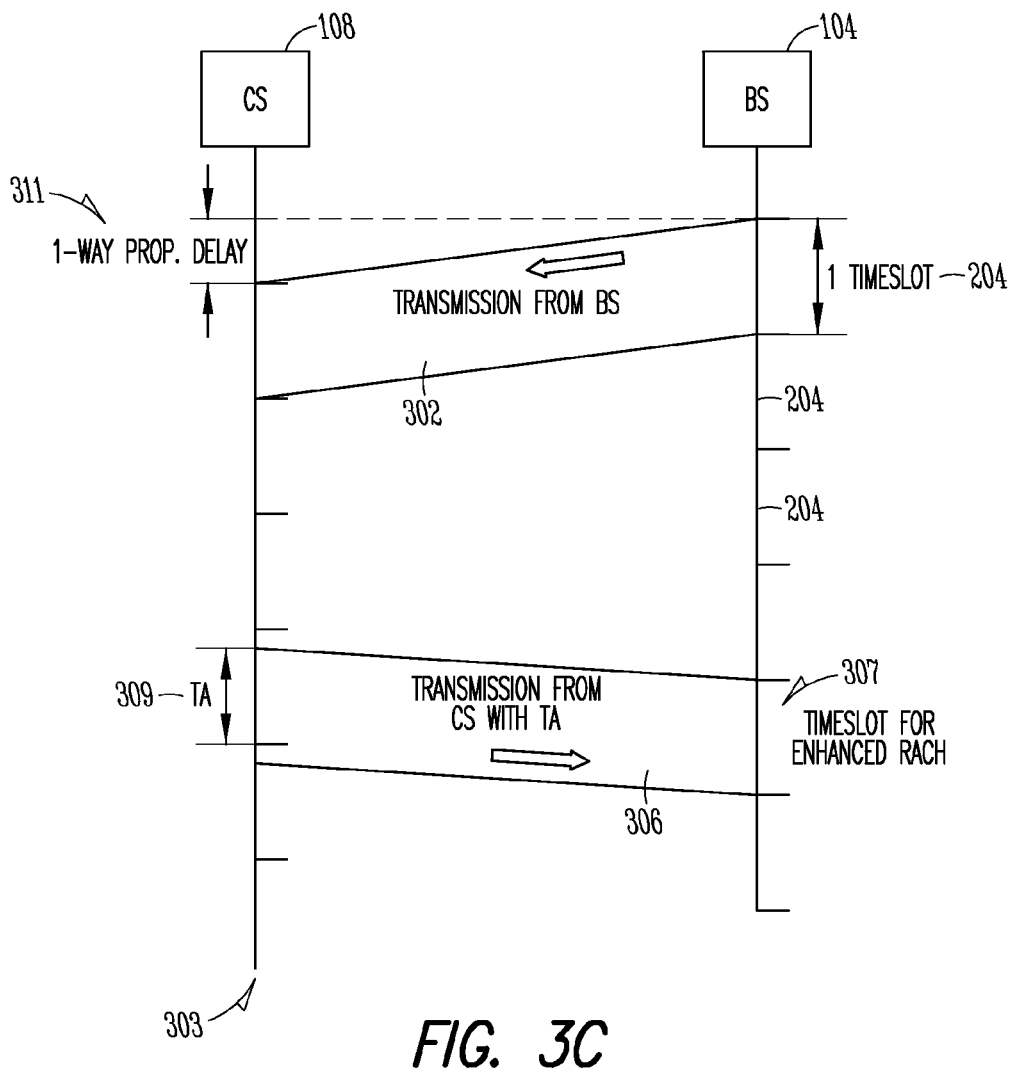
FIG. 3C illustrates the timing of a transmission by a communication station when the timing advance is known in accordance with some embodiments.

FIG. 3C illustrates a transmission by a communication station when the timing advance is known in accordance with some embodiments. A transmission 302 from base station 104 may be received by communication station 108 after a one-way signal propagation delay 311. A transmission 306 may be transmitted by communication station 108 with known timing advance (TA) 309 so that the transmission 306 is received by the base station 104 within single time slot 307. Transmission 306 may be transmitted on the enhanced RACH 105 (FIG. 1). The known timing advance 309 may compensate for the one-way propagation delay 311 between communication station 108 and the base station 104. In these embodiments, the transmission 306 may be configured to be almost as long as a slot time. In some embodiments, transmission 306 may be configured in normal-burst format 205 (FIG. 2) and transmitted on enhanced RACH 105 (FIG. 1), although this is not a requirement.

In accordance with some embodiments, timeslot 307 may be a time slot of the enhanced RACH 105 (FIG. 1). In these embodiments, a communication station, such as communication station 102 (FIG. 1), may perform an initial access on the enhanced RACH 105 when the timing advance is known by transmitting an initial access burst 103 (FIG. 1). In these embodiments, the initial access burst 103 may be configured for receipt within a single time-slot 307 of the enhanced RACH 105. The initial access burst 103 may include a shortened identifier for use in identifying the mobile station and/or data destined for a network destination 110.

Referring back to FIG. 1, in accordance with some embodiments, the notification 101 from the base station 104 may indicate that the enhanced RACH 105 is configured for initial access transmissions. The notification 101 may include parameters defining the enhanced RACH 105 and the communication station 102 may perform an initial access on the enhanced RACH 105 when a timing advance is known by the communication station 102. In these embodiments, the communication station 102 may have enhanced-RACH capability and may have previously indicated to the base station 104 (or the core network) that it has enhanced-RACH capability, for example during a prior registration process.

In some example embodiments, the enhanced RACH 105 may be configured for small data transfer (SDT). The notification 101 may include parameters defining the enhanced RACH 105 for SDT. In these embodiments, the user data transmitted on the enhanced RACH 105 may comprise a SDT. These embodiments are described in more detail below.

In some embodiments, different physical channels may be used for the primary RACH 107 and the enhanced RACH 105. The primary RACH 107 may be defined by a plurality of time slots and a first carrier frequency of a physical channel. The enhanced RACH 105 may be defined by one or more time slots and one or more carrier frequencies of a physical channel. In these embodiments, the primary RACH 107 may comprise most or all time slots of a physical channel, while the enhanced RACH 105 may comprise only a few time slots per frame or per multiframe of a physical channel, although the scope of the embodiments is not limited in this respect.

In some alternate embodiments, the same physical channel may be used by both the primary RACH 107 and the enhanced RACH 105. In some of these embodiments, the primary RACH 107 and the enhanced RACH 105 comprise different time slots of the same physical channel. In some of these embodiments, the primary RACH 107 may use an entire physical channel (e.g., timeslot 0 on a particular carrier in every frame), the enhanced RACH 105 may either partially or fully overlap the primary RACH 107 and the base station 104 may detect the different bursts. In some embodiments, the base station 104 may use blind detection to detect the different bursts.

In some embodiments, the primary RACH 107 and the enhanced RACH 105 may comprise logical channels that share one or more physical channels. Physical channels may comprise by one or more carrier frequencies which may include hopping carrier frequencies, although this is not a requirement.

In some embodiments, the primary RACH 107 may be used by communication stations, such as communication station 106 without an enhanced-RACH capability for transmitting access request messages 109 for an assignment of a channel resource for a subsequent transmission of data irrespective of the amount of data the communication station 106 may have to send. The enhanced RACH 105 may be used by communication stations having an enhanced-RACH capability, such as communication station 102, for transmitting the initial access burst 103 when an amount of data for transmission does not exceed an amount that can be transmitted in a single burst for receipt within a single time slot on the enhanced RACH 105. In some embodiments, when the amount of data for transmission exceeds the amount that can be transmitted within a single burst on the enhanced RACH 105, a communication station may either use the primary RACH 107 to transmit an access request message 109 for an assignment of a channel resource for subsequent transmission of the data, or may transmit the data in multiple bursts on the enhanced RACH 105.

In some embodiments, the enhanced RACH 105 may be used by communication stations having enhanced-RACH capability when the amount of data for transmission exceeds the amount that can be transmitted in a single burst. In these embodiments, data with a network destination 110 may be transmitted in multiple initial access bursts 103 on the enhanced RACH 105.

In some embodiments when data is transmitted on the enhanced RACH 105 in multiple initial access bursts, the network may respond with an assignment or an allocation of channel resources if one or more of the initial access bursts are not properly received (e.g., due to collisions). In these embodiments, the receipt of a subset of the data may be treated by the network as a request for resources to send the complete set of data. In these embodiments, when the data is transmitted in multiple initial access bursts, sequence numbers, for example, may be used to determine if any one or more of the bursts are not properly received.

In some embodiments when data is transmitted on the enhanced RACH 105 in multiple initial access bursts, the data from the multiple bursts may be combined at the base station 104 to reduce the amount of overhead (e.g., headers, etc.) associated with sending segmented data over the network. In some embodiments, the combining may be done at a relatively low level such as the radio-link control (RLC) or medium-access control (MAC) layers, although this is not a requirement.

In some embodiments in which data is transmitted in multiple bursts on the enhanced RACH 105, the frequency at which the multiple bursts are transmitted may be restricted so that other communication stations may be able to utilize the enhanced RACH 105 and to reduce the probability of collisions.

The primary RACH 107 may also be used by communication stations with enhanced-RACH capability when the timing advance is unknown or when a transmission using the enhanced RACH 105 is not appropriate given a quality-of-service (QOS) level requirement associated with the data.

Communication stations, such as communication station 106, without an enhanced-RACH capability may be referred to as legacy communication stations. Communication stations, such as communication station 102, with the enhanced-RACH capability may be referred to as non-legacy communication stations.

The access request messages 109 transmitted by legacy communication stations on the primary RACH 107 do not include data that has a network destination 110. Information transmitted within an access request message 109 transmitted in primary RACH 107 may be limited to information for establishing and operating a subsequent connection (such as a TBF or voice call) rather than data having a network destination 110. Information regarding the primary RACH 107 may be broadcast regularly by the base station 104 on a broadcast channel.

In some embodiments, the enhanced RACH 105 may also to be used by communication stations having enhanced-RACH capability for transmitting access request messages for an assignment of a channel resource for a subsequent transmission of data. One advantage to the use of the enhanced RACH 105 rather than the primary RACH 107 for transmission of an access request message is that the probability of collisions may be lower on enhanced RACH 105 than with primary RACH 107. In these embodiments, when the timing advance is known, a communication station with enhanced-RACH capability may include additional information in the access request message because the timing advance is known, and hence additional information may be transmitted while ensuring the access request message is received within a single time slot of the enhanced RACH 105. Furthermore, there would only be contention between communications stations with enhanced-RACH capability on the enhanced RACH 105.

In some embodiments, when the timing advance is unknown, the primary RACH 107 may be used for transmitting access request messages 109 for an assignment of a channel resource for a subsequent transmission of data. When the timing advance is unknown, a communication station with enhanced-RACH capability may refrain from transmitting an initial access burst 103 on the enhanced RACH 105.

In some embodiments, a communication station with enhanced-RACH capability may be a non-mobile communication station having a fixed geographic location. In these embodiments, the same or a predetermined timing advance may be used for data transfers over the enhanced RACH 105. In these embodiments, the non-mobile communication stations may transfer data within an initial access burst 103 over the enhanced RACH 105 and the initial access burst 103 may be configured by the non-mobile communication station to be no longer than a time-slot of the enhanced RACH 105. The initial access burst 103 may be configured to be in normal-burst format 205 (FIG. 1), although this is not a requirement.

In some of these embodiments, the non-mobile communication stations may comprise fixed nodes such as sensor nodes that report data over the network 100. Examples of sensor nodes include environmental sensors, electric and gas meters and other similar devices whose purpose is to report data such as sensor data. In some embodiments, machine-type communications (MTC) may be communicated over the enhanced RACH 105. MTC are generally, communications that do not involve a human user and may be communicated by MTC communication stations. In these embodiments, the same timing advance may be used by a communication station for all data transfers over the enhanced RACH 105 as long as the location of the communication station and the serving base station do not change their relative locations. In some of these embodiments, these non-mobile communication stations may be programmed with a predetermined timing advance, although this is not a requirement. In some embodiments, a particular cell may be dedicated for MTC communications and access may be configured for MTC-capable communication stations.

When the communication station 102 is a mobile communication station that does not have a fixed geographic location, the mobile station may determine whether the timing advance is currently known. In these embodiments, when the timing advance is known, the enhanced RACH 105 may be used for an initial access and transmission of data. When the timing advance is not known or when a known timing advance is not valid, the primary RACH 107 may be used for transmission of an access request message 109 and a subsequent transmission of data. A mobile station may determine whether the timing advance is currently known or has changed based on, for example, cell identification information transmitted by the base station 104, accelerometer data, global-positioning system (GPS) data, time and speed data, current or neighbor cell power level data, as well as other data that can be used to determine whether the timing advance is known. In some embodiments, when the timing advance is unknown, the mobile station may be able to determine the current timing advance so that it may use the enhanced RACH 105. In these embodiments, a mobile station may use conventional techniques, such as ranging, to measure the propagation delay and determine a current timing advance. The mobile station may also receive downlink channels from the base station 104 to determine the timing advance and may receive a timing advance update value from the network 100 for use in determining its timing advance.

In some embodiments, the enhanced RACH 105 may be configured as a normal-burst RACH (NB-RACH). The notification 101 received from the base station 104 may provide notification of existence of the NB-RACH and a communication station with enhanced-RACH capability may configure a burst size of an initial access burst 103 to be no greater than a time-slot of the NB-RACH. In these embodiments, initial access burst 103 may be configured as a normal burst in normal-burst format 205 (FIG. 2).

In some embodiments, data transmitted by communication station 102 on the enhanced RACH 105 may comprise data having either a low-latency requirement or a quality of service (QOS) level requirement that does not require an acknowledgement. In these embodiments, communication station 102 may use the enhanced RACH 105 for transmission of data that does not need to be acknowledged immediately by the network 100 or data that does not need to be acknowledged at all. The use of the enhanced RACH 105 may permit a very fast transmission of data when no acknowledgement is required because TBF setup is avoided. Sensor data and MTC, for example, may not require acknowledgements (e.g., because battery consumption of a sensor node may be more important than receiving an acknowledgment of the data). Some other examples of low-latency data and data that do not require an acknowledgement may include indications of message sent, indications of message read, status update and instant messages. Embodiments that do not utilize or require acknowledgements at a particular protocol layer may be referred to as operating in accordance with an unacknowledged (UNACK) mode. In some cases, acknowledgements (ACK) may be provided by high-layers rather than being provided by a physical layer or by protocols terminating within the radio access network or within the mobile network in general. For example, acknowledgements may be provided by higher-layers for some protocols that are not terminated within the network entities such as the base station or a serving GPRS support node (SGSN).

In some embodiments, the shortened identifier that may be included in the initial access burst 103 on the enhanced RACH 105 may be determined by either the communication station 102 or the base station 104 based on a full-length (e.g., a 32-bit) identifier that uniquely identifies the communication station 102, either globally or locally (e.g., within a routing area). In these embodiments, the shortened identifier may be based on a 32-bit international mobile subscriber identity (IMSI), a temporary logical link identifier (TLLI), a temporary mobile subscriber identity (TMSI), or some other identifier of the communication station 102. For example, the shortened identifier may comprise the last 5 bits of the full-length identifier. In these embodiments, the shortened identifier may be determined by either the communication station 102 or the base station 104.

In some embodiments, the shortened identifier may be substantially shorter than a full-length identifier. Because only communication stations that are known by the base station 104 to have enhanced-RACH capability transmit on the enhanced RACH 105, the shortened identifier may be used to uniquely identify each of these communication stations and reduce contention resolution. In these embodiments, the shortened identifier needs only to be long enough, in terms of the number of bits, to be able to distinguish communication stations with enhanced-RACH capability that may transmit on the enhanced RACH.

In some embodiments, the shorted identifier may be assigned by the network and may be determined based on the particular cell or cell ID. In some embodiments, a partial identifier may be used in combination with a RACH group (discussed below) to identify the communication station. In some embodiments, a hash function may be used (i.e., a hash of the full-length identifier or a shortened identifier. In some alternate embodiments, the full-length identifier may be used in the initial access burst 103 on the enhanced RACH 105.

In some embodiments, the notification 101 may include the shortened identifier for use by the communication station 102 to identify the communication station in the initial access burst 103. In these embodiments, the base station 104 may provide a shortened identifier to the communication station 102 for use on the enhanced RACH 105, although this is not a requirement. In some embodiments, the shortened identifier may be provided in addition to or instead of the parameters defining the enhanced RACH 105 transmitted in the notification 101.

In some embodiments, prior to receiving the notification 101 from the base station 104 of the existence of the enhanced RACH 105, the communication station 102 may perform a registration process with the network (e.g., via the base station 104). During the registration process, the communication station 102 may indicate whether or not it has enhanced-RACH capability to support data transmission on the enhanced RACH 105. During the registration process, the communication station 102 may provide the network with a full-length identifier that uniquely identifies the communication station 102. The registration process is not considered a request for channel resources and no resources are generally assigned to the communication station 102 for data transfer as part of the registration process. During the registration process, resources to allow completion of the registration process may be allocated. In some embodiments, the base station 104 may assign a shortened identifier to the communication station 102 when the communication station 102 indicates that it has enhanced-RACH capability. The shortened identifier may be provided to the communication station 102 in the notification 101.

In some embodiments, the initial access burst 103 may be triggered by an upper level layer of the communication station 102 that has data to send to a network destination 110 when the communication station 102 has no assigned resources on a data channel, such as resources on a packet data channel (PDCH). In these embodiments, data and the shortened identifier may be included in the initial access burst 103 transmitted on the enhanced RACH 105. This is unlike the use of a conventional RACH, such as the primary RACH 107, in which transmissions of data with a network destination 110 are not permitted. This is also unlike the use of a conventional RACH, such as the primary RACH 107, which do not include an identifier that allows the network to uniquely determine the identity of the transmitting station.

In some embodiments, when an amount of the data for transmission exceeds a predetermined value for transmission of the data on the enhanced RACH 105 or when the QoS requirements for the data do not meet one or more predetermined criteria, the communication station 102 may refrain from transmitting the initial access burst 103 on the enhanced RACH 105 and may attempt to establish a TBF with the base station 104 for transmission of the data. In these embodiments, the TBF may be established by sending an access request message 109 on the primary RACH 107 to request channel resources. In some embodiments, when a communication station 108 receives data from the upper layers data which exceeds the maximum permitted data transfer on the enhanced RACH 105, the communication station 108 may request an uplink TBF using the one-phase or two-phase access (e.g., in accordance with 3GPP TS 44.018), or may transmit a request for packet resources on the enhanced RACH 105.

In some embodiments, when a communication station 102 is permitted to access the enhanced RACH 105 at the time when data is received from upper layers, the communication station 102 may initiate transmission on the enhanced RACH 105 at the next opportunity. In some embodiments, for example if a communication station may generates upper layer traffic at pre-determined times (e.g. every hour), the communication station 102 may delay initial transmission by a random amount to avoid collisions with other devices which generate traffic at the same time.

In some embodiments, when data is received from upper layers, if the communication station 102 is not permitted to access the enhanced RACH 105 and has no opportunity to transmit on the enhanced RACH 105 within a pre-determined time window (e.g. within the current multiframe), the communication station 102 may initiate transmissions on the enhanced RACH 105 at one of the next opportunities. The selection of which opportunity to use may be random or quasi-random. The selection of which opportunity to use may have a predetermined probability range that any particular opportunity is selected, although this is not a requirement. These embodiments may avoid a situation in which multiple communication stations that have buffered traffic and which have the same or similar restrictions on when they can transmit on the enhanced RACH 105 initiate transmissions at the same instant. In some embodiments, depending on various parameters such as QoS vs. next opportunity delay and data size, a TBF may be established using primary RACH 107.

In some embodiments, the base station 104 may establish the enhanced RACH 105 by sending an enhanced-RACH notification message on a control channel (e.g., a PACCH) using a single block packet downlink assignment procedure. The enhanced-RACH notification message may indicate the parameters defining the enhanced RACH 105. In some time-division multiple access (TDMA) embodiments, the notification may include an identification of time-slots of TDMA frames that comprise the enhanced RACH 105. In some embodiments, the enhanced RACH notification message may indicate particular carrier frequency or other information that defines the enhanced RACH 105. In some embodiments, particular time slots of each TDMA frame may comprise the enhanced RACH 105, while other time slots of the frame may comprise other channels, such as packet data channels or the primary RACH 107. In some GSM embodiments, a TDMA frame may comprise eight time slots and may be approximately 4.6 ms long, although the scope of the embodiments is not limited in this respect. In an example embodiment, the third time slot, such as time slot 203 (FIG. 2) of each TDMA frame 202 may be assigned to the enhanced RACH 105.

In some embodiments, the notification 101 may be provided is a message individually directed to particular communication stations with enhanced-RACH capability (i.e., signaling point-to-point). In some alternate embodiments, the notification 101 may be broadcast to indicate the existence and characteristics of the enhanced RACH 105.

In some embodiments, the availability of the enhanced RACH may depend on the available resources. In these embodiments, the notification 101 may indicate that the enhanced RACH 105 is supported but is not presently available. This may indicate that the current cell is congested and may serve as a congestion indicator. In some embodiments, communication stations 108 that have low-latency data to transmit, such as MTC, may refrain from transmissions on the enhanced RACH 105 until the enhanced RACH 105 is available.

In some embodiments, the notification 101 of the enhanced RACH 105 may indicate a definition of the enhanced RACH 105, whether RACH groupings are applicable to the enhanced RACH 105, which packet-flow contexts (PFCs) may be used on the enhanced RACH 105, the shortened identifier to be used by a communication station on the enhanced RACH 105, whether pre-emptive re-transmissions are permitted on the enhanced RACH 105, a predetermined number of bursts that comprise a transmission on the enhanced RACH 105, any timing restrictions on the enhanced RACH 105, restrictions on an amount of data transmitted on the enhanced RACH 105, whether reception acknowledgements from the base station may be requested by the mobile station, and/or a validity time of the enhanced RACH 105.

In some embodiments, any pre-emptive retransmissions (e.g., when permitted) may be sent within a predetermined period of time (e.g., one second) of the first transmission in the sequence. In some embodiments, data belonging to a new sequence may be transmitted after predetermined period of time (e.g., five seconds) of the last transmission of the previous sequence.

In some embodiments, the base station 104 or other network entity 112 such as a SGSN may associate transmissions from the communication station 102 with a particular network destination 110. In these embodiments, the communication station 102 may refrain from including a network destination 110 address or other destination indicator for the data include in the initial access burst 103 on the enhanced RACH 105. The base station 104 may add the destination address to the data prior to transmitting or forwarding the data to the network destination 110. In these embodiments, all data transmissions over the enhanced RACH 103 by a particular communication station may have the same network destination 110. In some embodiments, a PDP context may have been established with the communication station 102 and be associated with a particular destination which allows the base station 104 or other network entity such as the SGSN to identify the target destination for the data.

In some embodiments, when the notification of the enhanced RACH 105 indicates that RACH groupings are applicable to the enhanced RACH 105, the communication station 102 may be assigned one of a plurality of RACH groups. Communication stations of a RACH group may be restricted to transmit an initial access burst 103 on the enhanced RACH 105 in TDMA frames assigned to the RACH group. In this way, a shorter identifier may be used because the identifier only needs to distinguish between communication stations in a RACH group. This is because initial access bursts 103 from communication stations of a particular RACH group would be received by the base station within TDMA frames assigned to that RACH group. In these embodiments, the identity of a communication station may be determined at least in part from the time (e.g. as characterized by a TDMA frame and/or timeslot) when the initial access burst is received. In these embodiments that use RACH groups, collisions may be reduced to collisions between communication stations of the same RACH group.

In some embodiments, when the notification 101 indicates that RACH groupings are applicable to the enhanced RACH 105, the communication station 102 may be assigned one of a plurality of RACH groups. The communication stations of a RACH group may provide a RACH group identifier along with the shortened identifier as part of the initial access burst 103. The identify of a communication station transmitting an initial access burst on the enhanced RACH 105 may be determined at least in part based on the RACH group identifier allowing shorter identifiers to be used. The use of shorter identifiers provides additional room for data within the initial access burst 103.

In some embodiments, the initial access burst 103 may include an indication of capabilities of the communication station 102. This indication of capabilities may be instead of or in addition to data having a network destination included in the initial access request 103. This indication of capabilities may be instead of or in addition to the shortened identifier that may be included in the initial access burst 103. These capabilities may include an indication that the communication station 102 has enhanced capabilities, as well as other capabilities of the communication station 102.

In some embodiments, the initial access burst 103 may be configured to include additional information, such as information about a requested data channel, information about capabilities of the communication station, and information identifying the communication station. The initial access burst 103 may also be a request for uplink channel resources and the additional information is other than or in addition to an indicator for either a radio link control (RLC) acknowledge or unacknowledge mode. In these embodiments, the request for uplink packet resources including one or more additional fields in addition to fields of a conventional channel request message or a conventional packet resource request message. In some embodiments, a conventional channel request message or a conventional packet resource request message may be used to convey this information within the initial access burst 103 on the enhanced RACH 105. Because the initial access burst 103 is transmitted with a timing advance to be received within a single time slot of the enhanced RACH 105, the initial access burst 103 can be properly received by the base station.

In some embodiments, the information about a requested data channel may includes at least one of an indication of an amount of data to be sent, an indication of signal quality, radio-frequency measurements (e.g., signal strength or interference measurements) or channel quality measurements, a priority associated with the data to be sent, and QoS parameters associated with the data to be sent. The QoS parameters, for example, may indicate the peak throughput or the class.

In some embodiments, the information about capabilities of the communication station may include information for use by a base station 104 in setting up a TBF with the communication station with parameters corresponding to the capabilities of the communication station. In these embodiments, an indicator of capability may be used by the network or the base station to assign uplink resources to make use of the communication station's capabilities when setting up the TBF.

In some embodiments, the communication station 102 may refrain from providing the information about capabilities when the initial access burst is not requesting TBF and when the initial access burst includes data having a network destination. In these embodiments, since the communication station is not requesting a TBF, there may be no need to include communication station capability.

In some embodiments, the timing advance may be an amount of time that may allow communication 102 to transmit bursts with shorter guard times to allow for an increase in the amount of information that may be included in a burst. In these embodiments, the timing advance may be a less precise or rough estimate of an amount of time to advance transmission of a burst to be sufficient to permit transmission of a burst containing more information than is conventionally contained within an access burst (where no timing advance knowledge is assumed). In some of these embodiments, the more accurate the timing advance, the longer the burst that can be transmitted allowing more information to be included within the burst.

In some embodiments, communication stations with enhanced RACH capability may use two or more burst formats for initial transmissions. The determination of which burst format may be based on whether or not the timing advance is known or valid. When the timing advance is known or valid, an initial transmission, such as initial access burst 103, may be transmitted on the enhanced RACH 105. The initial access burst 103 may be in normal-burst format 205 although this is not a requirement. When the timing advance is unknown or invalid, an initial transmission configured in accordance with access burst structure 320 may be transmitted on primary RACH 107.

Figure 4:
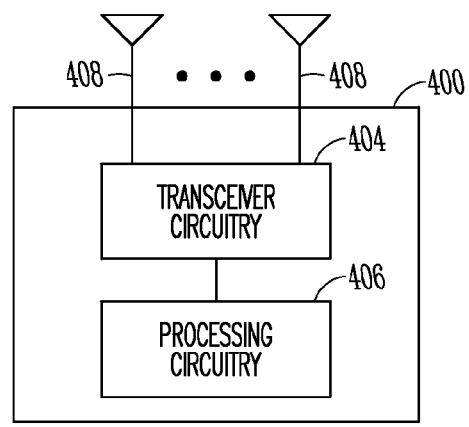
FIG. 4 is a functional block diagram of a communication station in accordance with some embodiments.

FIG. 4 is a functional block diagram of a communication station in accordance with some embodiments. Communication station 400 may include, among other elements, transceiver circuitry 404 and processing circuitry 406. Transceiver circuitry 404 may be coupled to one or more antennas 408 for transmitting and receiving signals from base stations, such as base station 104 (FIG. 1). Communication station 400 may have enhanced-RACH capability and may be suitable for use as any of communication stations 108 (FIG. 1) including communication station 102 (FIG. 1).

In accordance with some embodiments, the communication station 402 may be configured to transmit data on a random access channel. In these embodiments, the processing circuitry 406 may configure an initial access burst, such as initial access burst 103 (FIG. 1), for transmission on an enhanced RACH, such as enhanced RACH 105 (FIG. 1). The initial access burst may include at least one of a shortened identifier and data having a network destination 110 and may be configured to be no greater than a single time slot of the enhanced RACH 105. When the timing advance is known, the transceiver circuitry 404 may transmit the initial access burst 103 with a timing advance, such as timing advance 309 (FIG. 3C), to be received within the single time slot of the enhanced RACH 105.

In some embodiments, communication station 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a smart phone, or other device that may receive and/or transmit information wirelessly.

Antennas 408 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 408 may be effectively separated to take advantage of spatial diversity and the different channel characteristics that may result between each of antennas 408 and the antennas of a transmitting station.

Although communication station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of communication station 400 may refer to one or more processes operating on one or more processing elements. Processing circuitry 406 may comprise one or more processors.

In some embodiments, communication station 400 may be configured as a GPRS module having a fixed geographic location that is configured for MTC. In these embodiments, the processing circuitry 406 may configure an initial access burst for transmission on the enhanced RACH 105. The initial access burst 103 may include data having a network destination 110 and the initial access burst 103 may be configured to be no greater than a single time slot of the enhanced RACH. The transceiver circuitry 404 may transmit the initial access burst with a timing advance to be received within the single time slot of the enhanced RACH 105. In these embodiments, the data included in the initial access burst may be a small data transfer (SDT) that is limited to a predetermined number of bits (e.g., less than eleven uncoded bits or thirty-six coded bits). In some of these embodiments, the initial access burst may be configured in normal-burst format 205 (FIG. 2). In some embodiments, the GPRS module may be part of a sensor device configured to report sensor data over a GSM network.

Figure 5:
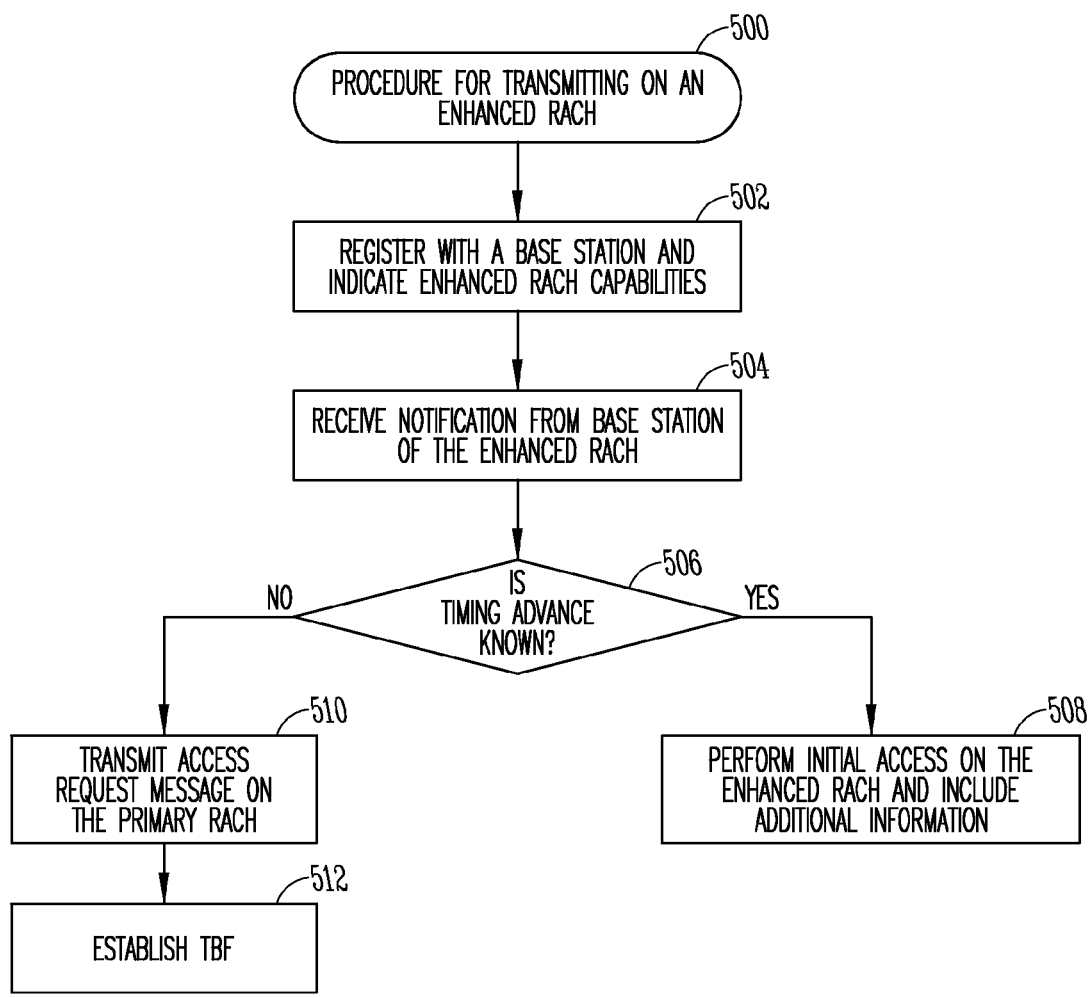
FIG. 5 is a procedure for transmitting on an enhanced RACH in accordance with some embodiments.

FIG. 5 is a procedure for transmitting on an enhanced RACH in accordance with some embodiments. Procedure 500 may be performed by a communication station, such as communication 102 (FIG. 1), for transmitting on an enhanced RACH, such as enhanced RACH 105 (FIG. 1). In operation 502, the communication station may register with a base station and may indicate that it has enhanced-RACH capabilities. During the registration, the communication station may provide its full-length identifier to the base station.

In operation 504, the communication station may receive a notification from the base station of the existence of the enhanced RACH. The notification may indicate the parameters defining the enhanced RACH including an identification of the particular time slots of TDMA frames that comprise the enhanced RACH. The notification may also include a shortened identifier that the communication station may use when transmitting on the enhanced RACH. In some embodiments, the notification may include the timing advance for use in transmitting on the enhanced RACH, although this is not a requirement.

In operation 506, the communication station determines whether its timing advance is known. When the timing advance is known and believed to be valid, operation 508 is performed. When the timing advance is unknown or not believed to be valid, operation 510 is performed.

In operation 508, the communication station may perform an initial access on an enhanced RACH by transmitting an initial access burst. The initial access burst is transmitted based on the timing advance to be received by the base station within a single time slot of the enhanced RACH. The initial access may include additional information not normally included in a conventional access request message, such as data having a network destination, a shortened identifier for use in identifying the communication station, or other information such as information about a requested data channel, information about capabilities of the communication station, and information identifying the communication station.

In operation 510, the communication station may transmit an access request message on the primary RACH. In operation 512, the communication station may be allocated bandwidth on a communication channel. In some embodiments, a TBF may be established for the transmission of uplink data from the communication station to the base station, although establishing a TBF is not a requirement.

Although the individual operations of procedure 500 are illustrated and described as separate operations, one or more of the individual operations may be performed concurrently, and nothing requires that the operations be performed in the order illustrated.

Figure 6:
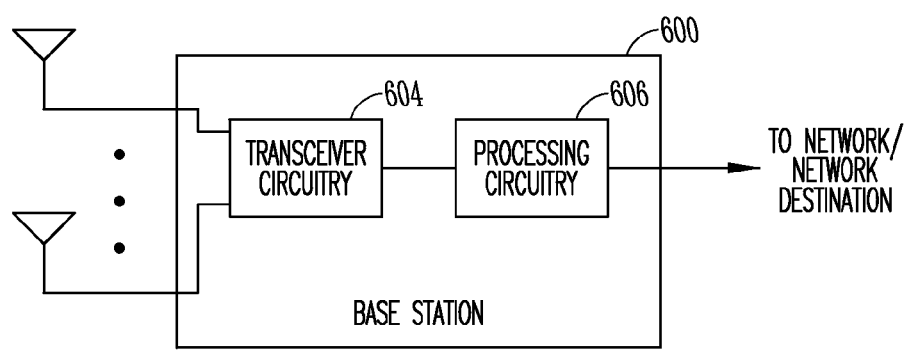
FIG. 6 is a functional block diagram of a base station in accordance with some embodiments.

FIG. 6 is a functional block diagram of a base station in accordance with some embodiments. Base station 600 includes, among other things, transceiver circuitry 604 and processing circuitry 606. Transceiver circuitry 604 may be configured to transmit and receive RF signals using one or more of antennas 608. Base station 600 may be suitable for use as base station 104 (FIG. 1) although other configurations may also be suitable.

In accordance with some embodiments, the processing circuitry 606 may be configured to cause the transmitter circuitry 604 to receive an initial access burst, such as initial access burst 103 (FIG. 1), from a communication station, such as communication station 102 (FIG. 1), on an enhanced RACH, such as enhanced RACH 105 (FIG. 1). The initial access burst may include a shortened identifier to identify the communication station. The initial access burst may alternatively or also include data. As discussed above, the initial access burst may have been transmitted by a communication station with a known timing advance to be received within a single time slot of the enhanced RACH 105.

In accordance with some embodiments, the data included in the initial access burst and received on the enhanced RACH 105 may include data having a network destination 110 (FIG. 1). The processing circuitry 606 may be configured to associative additional information with the data for forwarding to the network destination 110. These embodiments are discussed in more detail below.

Antennas 608 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 608 may be effectively separated to take advantage of spatial diversity and the different channel characteristics that may result between each of antennas 608 and the antennas of a transmitting station.

Although base station 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of base station 600 may refer to one or more processes operating on one or more processing elements. Processing circuitry 606 may comprise one or more processors. In some embodiments, some of the functions and operations performed by the base station 600 may be performed other network entities such as a base station controller.

Figure 7:
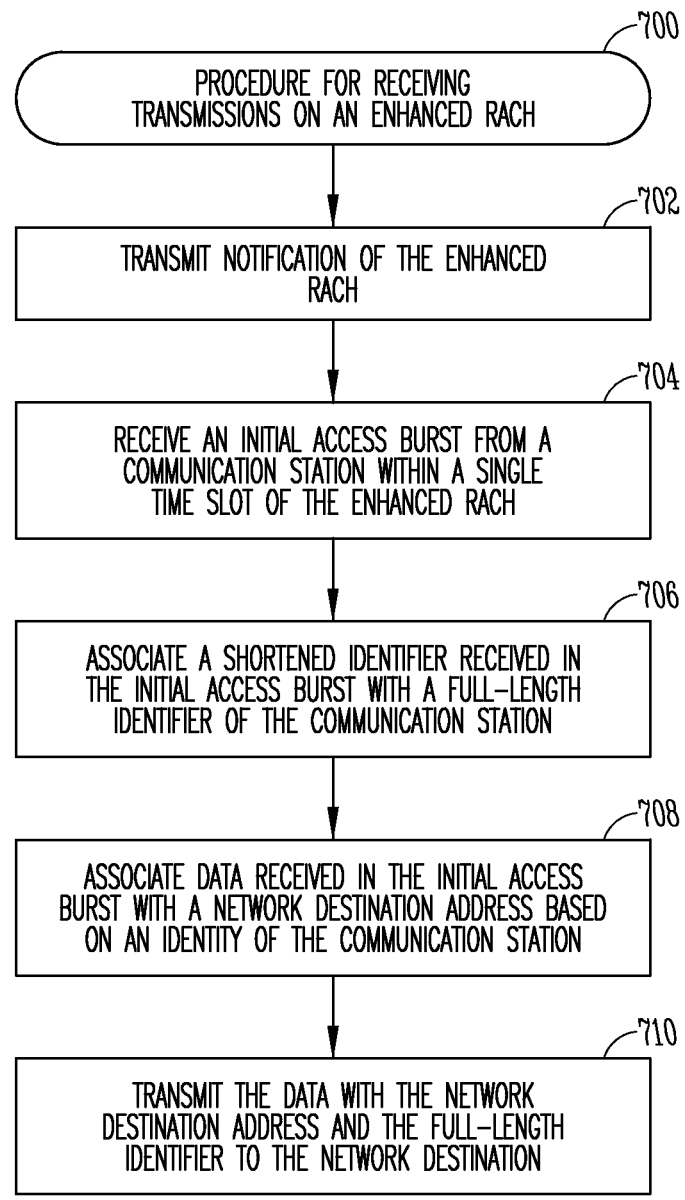
FIG. 7 is a procedure for receiving transmissions on an enhanced RACH in accordance with some embodiments.

FIG. 7 is a procedure for receiving transmissions on an enhanced RACH in accordance with some embodiments. Procedure 700 may be performed by a base station, such as base station 600 (FIG. 6), or other network entity, such as network entities 112. In some embodiments, portions of the procedure 700 may be performed other network entity, such as a SGSN.

Operation 702 comprises transmitting a notification, such as notification 101 (FIG. 1), of the enhanced RACH. The notification may include parameters defining the enhanced RACH for initial access transmissions. In some embodiments, the parameters may include an identification of timeslots of TDMA frames that comprise the enhanced RACH. In some embodiments, a shortened identifier may be provided to a communication station with enhanced-RACH capability for use in a subsequent transmission on the enhanced RACH. In some embodiments, the parameters of the notification may indicate if the normal-burst format is to be used for initial access bursts on the enhanced RACH.

Operation 704 comprises receiving an initial access burst from a communication station on the enhanced RACH. The initial access burst 103 may include a shortened identifier to identify the communication station and data, although this is not a requirement. The initial access burst 103 may have been transmitted by the communication station 102 with a timing advance to be received within a single time slot of the enhanced RACH 105.

Operation 706 comprises associating information such as the shortened identifier received in the initial access burst with a full-length identifier of the communication station.

Operation 708 comprises associating data received in the initial access burst with a network destination address based on an identity of the communication station. In these embodiments, the data included in the initial access burst received on the enhanced RACH 105 may comprise data having a network destination. In these embodiments, the base station or other network entity may associate additional information with the data for forwarding to the network destination. The data may be combined with additional information, such as a source or destination address, and/or a full-length identifier of the communication station.

In some embodiments, the data received in the initial access burst may be associated with a network destination address based on an identity of the communication station. In operation 710, the data with the network destination address and the full-length identifier may be transmitted or forwarded to a network destination, such as network destination 110 (FIG. 1).

In some embodiments, prior to receiving the initial access burst in operation 704, the base station may perform an initial registration with the communication station to receive the full-length identifier of the communication station and may provide the shortened identifier to the communication station in the notification 101 of the enhanced RACH. The shortened identifier may be for use by the base station to distinguish between transmissions on the enhanced RACH 105 from other communication stations with enhanced-RACH capability.

Although the individual operations of procedure 700 are illustrated and described as separate operations, one or more of the individual operations may be performed concurrently, and nothing requires that the operations be performed in the order illustrated. Furthermore, there is no requirement that both operations 706 and 708 be performed as either operation may be optional.

Embodiments may be implemented in one or a combination of hardware, firmware and software. Embodiments may also be implemented as instructions stored on a computer-readable storage medium, which may be read and executed by at least one processor to perform the operations described herein. A computer-readable medium may include any tangible medium for storing in a form readable by a machine (e.g., a computer). For example, a computer-readable medium may include read-only memory (ROM), random-access memory (RAM), magnetic disk storage media, optical storage media, and flash-memory devices.

Although many embodiments described herein relate to GSM networks, including GPRS and EGPRS networks, embodiments are generally applicable to any wireless network that uses a TDMA random-access channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for transmitting on an enhanced random-access channel (RACH) by a device such that an initial access burst is received in a single time slot by a wireless network, the method comprising:
receiving a notification from a base station indicating that the enhanced RACH is configured for initial access transmissions, the notification including parameters defining the enhanced RACH including an identification of time-slots of frames that comprise the enhanced RACH, the initial access burst has a network destination, and the enhanced RACH is a secondary RACH;
determining a timing advance, the timing advance being associated with a serving cell;
using a primary RACH for transmitting an access request message for an assignment of a channel resource for a subsequent transmission of the data, wherein the primary RACH is provided by the base station for transmission of access request messages by devices requesting assignment of a channel resource;
determining that an amount of data exceeds an amount that can be transmitted in a single access burst for receipt within a single time slot on the enhanced RACH;
determining an initial access burst and one or more subsequent access bursts for transmission on the enhanced RACH, the initial access burst to include at least one of an identifier or user data, and the subsequent access burst to include at least user data;
transmitting, using the determined timing advance, the initial access burst, on the enhanced RACH; and
subsequently transmitting the one or more subsequent access bursts on the enhanced RACH based on the timing advance.

2. The method of claim 1 wherein the primary RACH is to be used by the devices without an enhanced-RACH capability for transmitting the access request messages, wherein the enhanced RACH is to be used by the devices having the enhanced-RACH capability when the amount of data for transmission does not exceed the amount that can be transmitted in a single burst for receipt within a single time slot on the enhanced RACH.

3. The method of claim 2 wherein the initial access burst is triggered by an upper-level layer of the device that has data to send to the network destination when the device has no assigned resources on a data channel for data transmission, and
wherein when the amount of the data for transmission exceeds a predetermined amount, or when quality-of-service (QoS) requirements for the data do not meet one or more predetermined criteria able to be met by the enhanced RACH, the method comprises: refraining from transmitting the initial access burst on the enhanced RACH; and requesting a temporary block flow for transmission of the data.

4. The method of claim 1 wherein the enhanced access burst is configured in accordance with a legacy access burst structure.

5. The method of claim 1 wherein the data transmitted by the device on the enhanced RACH comprises data having either a low-latency requirement or a quality of service level requirement that does not require an acknowledgement from a radio access network.

6. The method of claim 1 wherein transmissions on the enhanced RACH are to be configured in a normal-burst format, wherein the method further includes the device configuring the initial access burst for transmission on the enhanced RACH in accordance with a normal-burst format, and wherein transmission of the initial access burst in the normal-burst format is no greater than a time-slot of the enhanced RACH.

7. The method of claim 6 wherein the device is a non-mobile communication station having a fixed geographic location, wherein a same timing advance is to be used for the non-mobile communication station for small data transfers over the enhanced RACH, and wherein the small data transfers comprise machine-type communications (MTC).

8. The method of claim 1 wherein the base station and the device operate within the wireless network,
wherein prior to receiving the notification from the base station of the enhanced RACH, the method comprises the device indicating to the wireless network whether the device has enhanced-RACH capability to support small data transmission on the enhanced RACH and provides the wireless network with a full-length identifier that uniquely identifies the device,
wherein the notification received from the base station includes the identifier to identify the device from other devices with enhanced-RACH capability, and
wherein the initial access burst includes the identifier.

9. The method of claim 1 wherein the base station establishes the enhanced RACH by sending an enhanced-RACH notification message on a control channel using a single block packet downlink assignment procedure.

10. The method of claim 1 further comprising transmitting enhanced RACH capability information associated with the device in the initial access burst.

11. A non-transitory computer readable storage medium having instructions stored thereon that, when executed, cause a machine to implement the method as defined in claim 1.

12. A device comprising a processor configured to at least:
determine that an amount of data exceeds an amount that can be transmitted in a single access burst for receipt within a single time slot on an enhanced random-access channel (RACH);
configure an initial access burst and one or more subsequent access bursts for transmission on the enhanced RACH when a timing advance (TA) is known by the communication station, the initial access burst to include at least one of an identifier or user data, and the subsequent access burst to include at least user data;
cause transceiver circuitry to:
receive a notification from a base station indicating that the enhanced RACH is configured for initial access transmissions, the notification including parameters defining the enhanced RACH including an identification of time-slots of frames that comprise the enhanced RACH, the initial access burst has a network destination, and the enhanced RACH is a secondary RACH;
using a primary RACH for transmitting an access request message for an assignment of a channel resource for a subsequent transmission of the data, wherein the primary RACH is provided by the base station for transmission of access request messages by devices requesting assignment of a channel resource;

transmit the initial access burst based on the timing advance to be received by a base station within a single time slot of the enhanced RACH; and
subsequently transmit the one or more subsequent access bursts on the enhanced RACH based on the timing advance.

* * * * *